United States Patent
Schmidt et al.

(10) Patent No.: US 8,024,634 B2
(45) Date of Patent: Sep. 20, 2011

(54) SYSTEM AND METHOD FOR IMPLEMENTING A SUBRATE RECOVERY FOR LOST PACKETS IN A COMMUNICATIONS ENVIRONMENT

(75) Inventors: Paul A. Schmidt, Cary, NC (US);
Bernie P. Pearce, Morrisville, NC (US);
John P. Fussell, Raleigh, NC (US);
Christopher Brezovec, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 11/834,965

(22) Filed: Aug. 7, 2007

(65) Prior Publication Data

US 2009/0044066 A1 Feb. 12, 2009

(51) Int. Cl.
*G08C 25/02* (2006.01)
(52) U.S. Cl. ......................................................... 714/748
(58) Field of Classification Search ...................... 714/748
See application file for complete search history.

(56) References Cited

U.S. PATENT DOCUMENTS

| | | | |
|---|---|---|---|
| 5,894,557 A | 4/1999 | Bade et al. | 395/200.58 |
| 6,134,245 A | 10/2000 | Scarmalis | 370/474 |
| 6,192,051 B1 | 2/2001 | Lipman et al. | 370/389 |
| 6,363,065 B1 | 3/2002 | Thornton et al. | 370/352 |
| 6,400,722 B1 | 6/2002 | Chuah et al. | 370/401 |
| 6,477,595 B1 | 11/2002 | Cohen et al. | 710/105 |
| 6,512,754 B2 | 1/2003 | Feder et al. | 370/338 |
| 6,512,773 B1 | 1/2003 | Scott | 370/395.61 |
| 7,403,528 B2 * | 7/2008 | Hu et al. | 370/394 |
| 2004/0218739 A1 * | 11/2004 | Nicol | 379/93.33 |
| 2007/0168826 A1 * | 7/2007 | Terry et al. | 714/748 |

* cited by examiner

*Primary Examiner* — M. Mujtaba Chaudry
*Assistant Examiner* — Enam Ahmed
(74) *Attorney, Agent, or Firm* — Baker Botts L.L.P.

(57) ABSTRACT

A method for communicating data is provided that includes receiving a plurality of bits associated with a communications flow and recovering data lost from a packet by retransmitting selected subrate data for a lost sample over a specified time period. The method may further include transmitting one additional subrate for each sample. All data is generally retransmitted in a configured time interval and the additional subrate for each sample is transmitted every twenty milliseconds. In still other embodiments, the method includes skipping over any subrates that have already been transmitted within a recovery interval. In one implementation of the present invention, if any subrates had changed and had already been transmitted within the time period, there is no retransmit operation performed. If a lost packet is detected for a sample already in recovery, the time period is reset and a recovery process is initiated again.

18 Claims, 6 Drawing Sheets

SYSTEM AND METHOD FOR IMPLEMENTING A SUBRATE RECOVERY FOR LOST PACKETS IN A COMMUNICATIONS ENVIRONMENT

TECHNICAL FIELD OF THE INVENTION

The present invention relates in general to the field of communications and, more particularly, to a system and a method for implementing a subrate recovery for lost packets in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve a system benefit per-unit of cost.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique. Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between a base transceiver station and a base station controller.

In some cases where a backhaul packet is lost, due to physical errors or link congestion, the entire subrate sample set is retransmitted for the purpose of re-synchronizing the receiver. This re-synchronization method results in the transmission of the largest allowable backhaul packet size. The subsequent indiscriminant transmission of a large backhaul packet, when the backhaul network is already or nearly congested, contributes to congestion and indirectly results in additional lost packets. This creates an intractable congestion situation, ultimately affecting user conversations.

Accordingly, the ability to provide a communication system that consumes few resources, addresses error issues, optimizes bandwidth, and achieves minimal delay presents a significant challenge for network operators, service providers, and system administrators.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF EXAMPLE EMBODIMENTS OF THE INVENTION

According to one embodiment of the present invention, a method for communicating data is provided that includes receiving a plurality of bits associated with a communications flow and recovering data lost from a packet by retransmitting selected subrate data for a lost sample over a specified time period.

The method may further include transmitting one additional subrate for each sample. All data is generally retransmitted in a configured time interval and the additional subrate for each sample is transmitted every twenty milliseconds. In still other embodiments, the method includes skipping over any subrates that have already been transmitted within a recovery interval. In one implementation of the present invention, if any subrates had changed and had already been transmitted within the time period, there is no retransmit operation performed. If a lost packet is detected for a sample already in recovery, the time period is reset and a recovery process is initiated again.

Certain embodiments of the present invention may provide a number of technical advantages. For example, according to one embodiment of the present invention, a communications approach is provided that substantially reduces (almost eliminates) the possibility of inducing congestion as a result of lost packet error recovery. Also, recovery for all subrate channels is provided in a configurable time interval for the latest lost packet. In addition, there is no retransmit required for active subrates, which further reduces the recovery time. Moreover, recovery from multiple subsequent backhaul errors is possible. Finally, no backhaul overhead is incurred when there are no lost packets.

Certain embodiments of the present invention may enjoy some, all, or none of these advantages. Other technical advantages may be readily apparent to one skilled in the art from the following description and claims.

Figure 1:
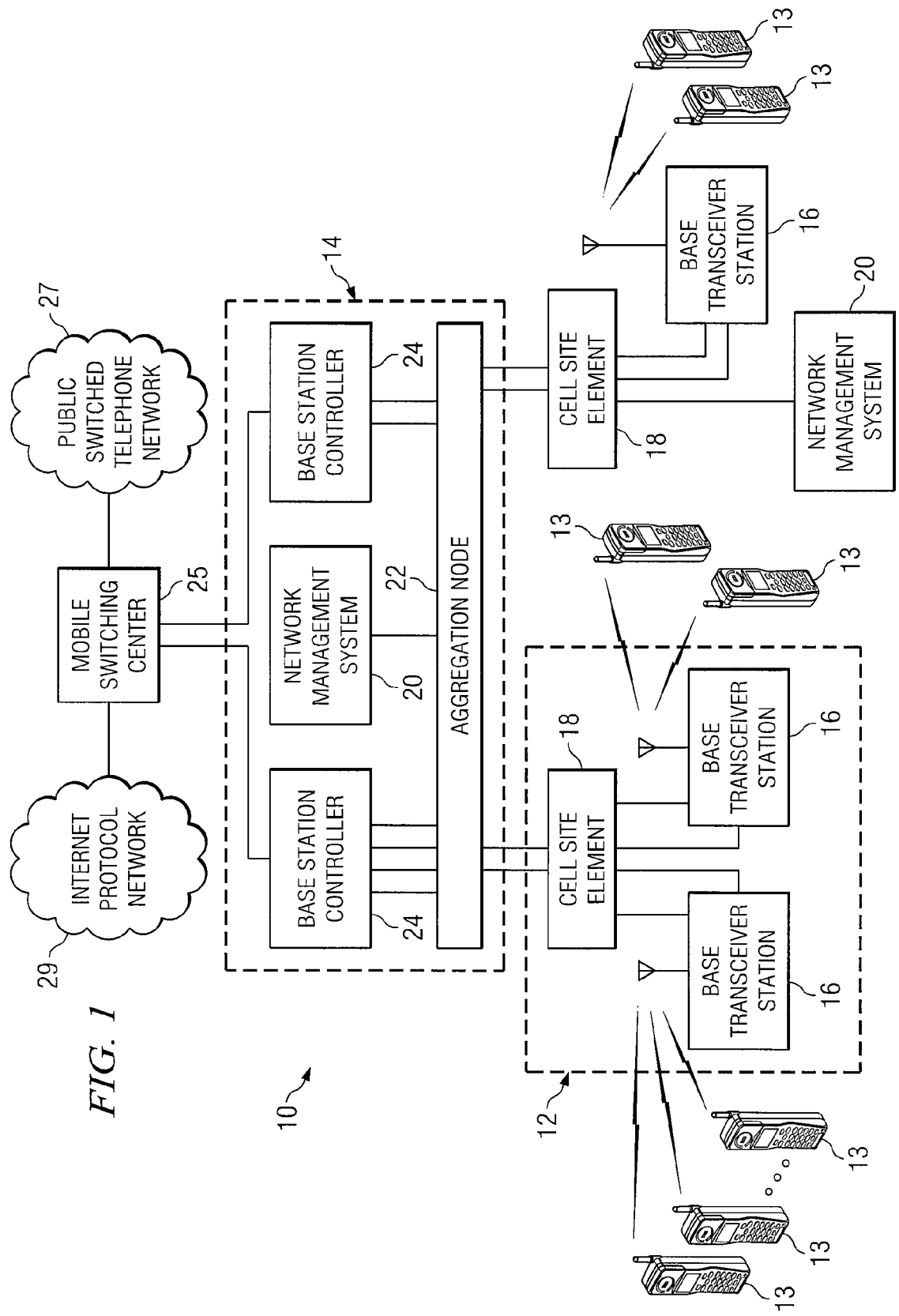
FIG. 1 is a simplified block diagram of a communication system for providing a retransmit for error recovery in a network environment.

FIG. 1 is a simplified block diagram of a communication system 10 for providing an error recovery/retransmit protocol in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Note the communications links extending between cell site element 18 and aggregation node 22, as compared to the number of communication links extending between cell site element 18 and base transceiver stations 16. By implementing the suppression techniques (and as explained in detail below), a reduction in communication links between cell site 12 and central office site 14 is achieved.

Communication system 10 may generally be configured or arranged to represent 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

As illustrated in FIG. 1, in a GSM network, a backhaul network exists between a BTS and a BSC. The backhaul can be used to transmit voice conversations, data, and control information using various standards and proprietary vendor specific formats. In order to address operational expenses, a backhaul optimization scheme is desired that will provide significant bandwidth savings, while maintaining low latency and end-to-end transmissions for all possible frame types.

In order to reduce operating expenditures, backhaul optimization techniques are needed to offer bandwidth savings, while maintaining low latency end-to-end transmissions for all possible frame types. According to one method, IP backhaul packets containing optimized GSM subrate data are transmitted every two milliseconds. In the event that a backhaul packet is lost, due to physical errors or link congestion, the entire subrate sample set is retransmitted for the purpose of re-synchronizing the receiver. This re-synchronization method results in the transmission of the largest allowable backhaul packet size. The subsequent indiscriminant transmission of a large backhaul packet, when the backhaul network is already or nearly congested, contributes to congestion and indirectly results in additional lost packets. This creates an intractable congestion situation, ultimately affecting user conversations.

In accordance with the teachings of the present invention, communication system 10 addresses the recovery issue in the following manner. Instead of retransmitting samples in a single backhaul packet (which in practice can lead to further congestion and more lost packets), samples are distributed over multiple packets. This limits the backhaul packet size, and consequently avoids further congestion.

Such an approach is advantageous for the following reasons. First, it substantially reduces (almost eliminates) the possibility of inducing congestion as a result of lost packet error recovery. Second, recovery for all subrates channels is executed during a given time interval (e.g., approximately five seconds) for the latest lost packet. The system is flexible in that the maximum time for recovery can be configured. More than one subrate can be retransmitted in each backhaul packet. The recovery time can essentially be configured to extend or shorten the recovery time based on the backhaul bandwidth limitations. Third, there is no retransmit for active subrates being required, which further reduces the recovery time. Fourth, recovery from multiple subsequent backhaul errors is possible. Fifth, no backhaul overhead is incurred when there are no lost packets.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique (i.e. cannot be recreated at aggregation node 22). Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between base transceiver station 16 and base station controller 24.

Note that when packets are being transmitted over a high-latency backhaul network, such as over a satellite communications link or over multiple router hops, it is possible that backhaul packet errors will occur, resulting in lost voice or data samples. This is particularly problematic in the case of GSM compression, or for any algorithm that relies on transmitting the delta between a sample and the previous sample. For voice telephone calls, the result could be extended periods of undesirable noise.

The present invention addresses lost packet issues, and others, in the following way. A backhaul packet is transmitted every two milliseconds, whereby each backhaul packet contains information about 1/10 (in this example) of a normal GSM TRAU frame. The backhaul packet principally contains a bit map and a 16-bit sample for each 8 kbps subrate that has changed between the current and tenth previous sample. Samples that have not changed are excluded from the backhaul packet. Since a packet is transmitted every two milliseconds, and ten samples are required for a complete frame, the receiving node can replay a TRAU every 20 milliseconds.

When an error occurs in a backhaul packet, it can cause a portion of a normal TRAU frame to be incorrect. Consider for example if the bits that make up the TRAU synchronization header are in error. If there is no recovery, the receiving node will replay an incorrect TRAU frame every 20 milliseconds. If a round-trip delay time is incurred for a satellite network, invalid TRAU frames could stagnate (e.g. for as long as 700 milliseconds).

Communication system 10 eliminates these issues by retransmitting samples in a distributed manner: over multiple packets. This limits the backhaul packet size, and consequently avoids further congestion. Details about these operations are described below with reference to corresponding FIGURES. The discussion immediately below focuses on the components of FIG. 1.

Mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, various traffic protocols (e.g. time division multiplexed (TDM), GSM 8.60, Frame Relay, high level data link control (HDLC), asynchronous transfer mode (ATM), point to point protocol (PPP) over HDLC, TRAU, vendor-specific formats, etc.) may be used and communicated by each base transceiver station 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within, or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

Figure 2A:
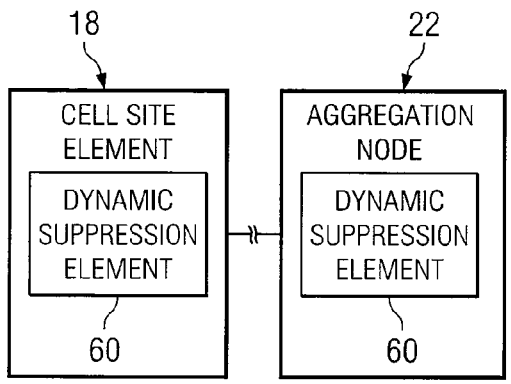
FIG. 2A is a block diagram of an example internal structure associated with either a cell site element or an aggregation node of the communication system.

FIG. 2A is a simplified block diagram of an example internal structure of cell site element 18 and aggregation node 22, both of which include a dynamic suppression element 60. In one embodiment, dynamic suppression element 60 is an algorithm (potentially included in appropriate software) that achieves the suppressing operations and/or the retransmit protocol for error recovery as described herein.

The functional flow of communication system 10 may follow a bits in/bits out protocol, being dependent only on the received bit pattern. Input DS0s may be demultiplexed to create an appropriate number of sub-rate DS0s, each corresponding to a different call. (Note that some DS0s are not assigned to any call and still others are used for control information.) For each sub-rate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

TDM streams may be TDM multiplexed to generate appropriate DS0s, which are further combined with drop-and-insert DS0s to create T1/E1s. Based on the header of the overall multiplexed packet, appropriate line conditions or alarms may be generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one-bit errors.

It is critical to note that dynamic suppression element 60 may be changed considerably, as it offers only one example error recovery protocol configuration that could be implemented by communication system 10.

Figure 2B:
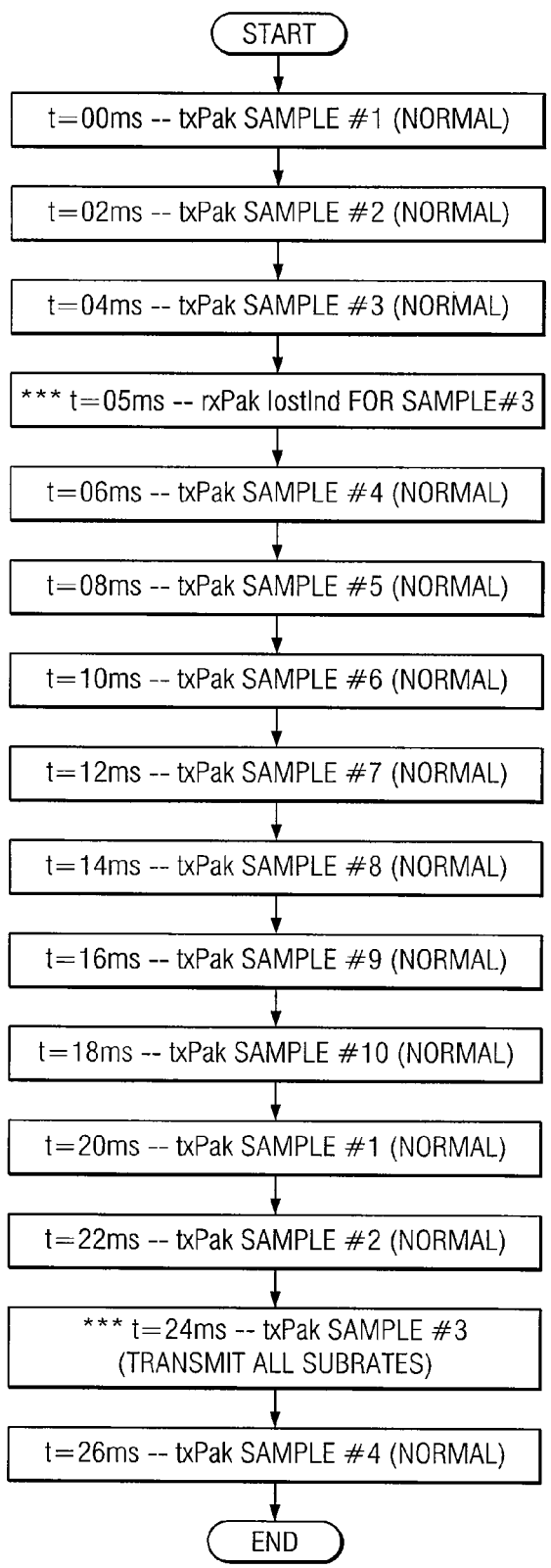
FIGS. 2B-E are simplified flows that illustrate various recovery approaches that can be used in the communication system.

FIGS. 2B-2E offer some operations that may be performed by dynamic suppression element 60, which resides in either the aggregation node or the cell site element (or both in some instances). One method for recovering data from lost backhaul packets is to retransmit ALL subrate data. FIG. 2B is a simplified flow that illustrates this operation. The retransmission of all subrates has the effect of delaying subsequent backhaul packets because of its large size (31-timeslot=496-bytes of sample data).

Figure 2C:
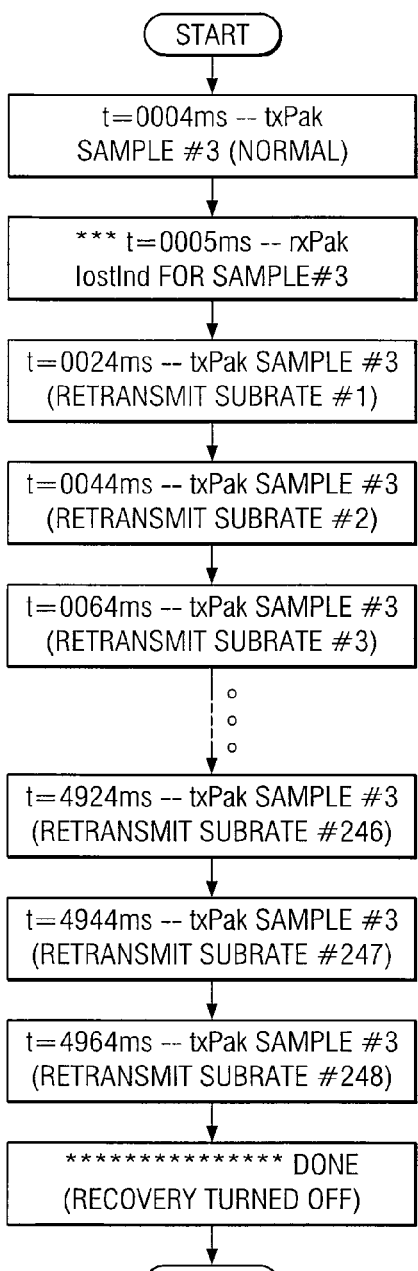

An alternative method of recovering the data from lost backhaul packets is to retransmit the subrate data for the lost sample over time. For example, transmit one additional subrate for each sample (every 20 ms), where in this scenario, all data retransmitted within a maximum of 5 seconds. FIG. 2C is a simplified flow that illustrates this operation.

Figure 2D:
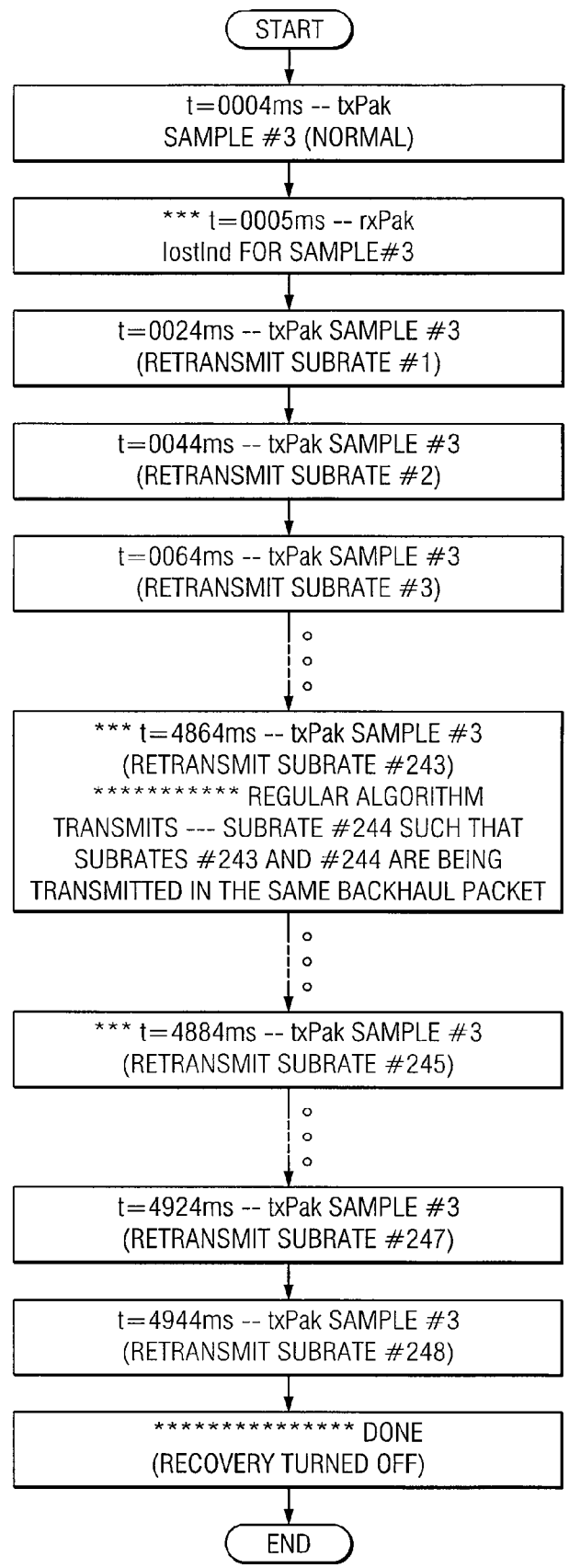

As a corollary to these protocols, another method of addressing subrate recovery would operate in the following manner. Skip over any subrates that have already been transmitted via the normal changing data algorithm within the lost packet ['lostPak'] recovery interval. If any subrates had changed and already been transmitted within the given recovery interval, there is no need to retransmit via the lostPak recovery mechanism. FIG. 2D is a simplified flow that illustrates this operation.

Normally, #244 would be retransmitted at t=4884 ms, but since it was previously transmitted by the normal algorithm of changing subrate at t=4864 ms, the operation skips ahead to retransmit the next subrate #245 at t=4884 ms. Subrate #243 & #244 are being transmitted in the same backhaul packet. The lostPak recovery is finished a little earlier because not all subrates required retransmission.

Figure 2E:
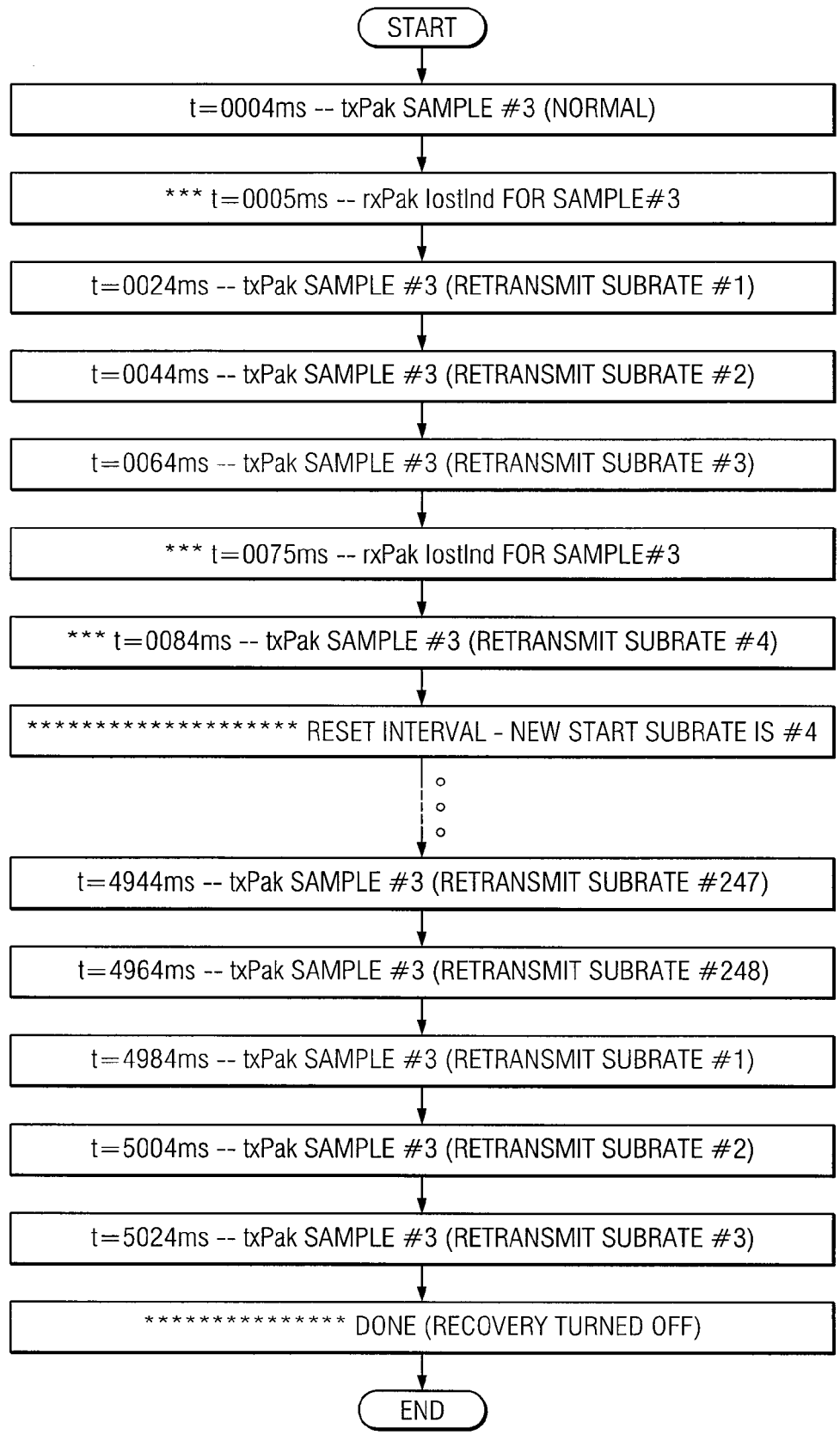

As a second corollary, if a lost packet for a sample already in recovery is detected, the interval is reset and the recovery process is started again. FIG. 2E is a simplified flow that illustrates this operation.

Before turning to subsequent FIGURES, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data or communicating a retransmit for error recovery as implied, described, or offered herein.

As identified above, each of these elements may include software and/or an algorithm to effectuate error recovery for voice or packet data applications as described herein. Alternatively, such suppression and retransmit operations and techniques may be achieved by any suitable hardware, component, device, application specific integrated circuit (ASIC), additional software, field programmable gate array (FPGA), processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, such a functionality could be readily embodied in a separate component, device, or module.

Figure 3:
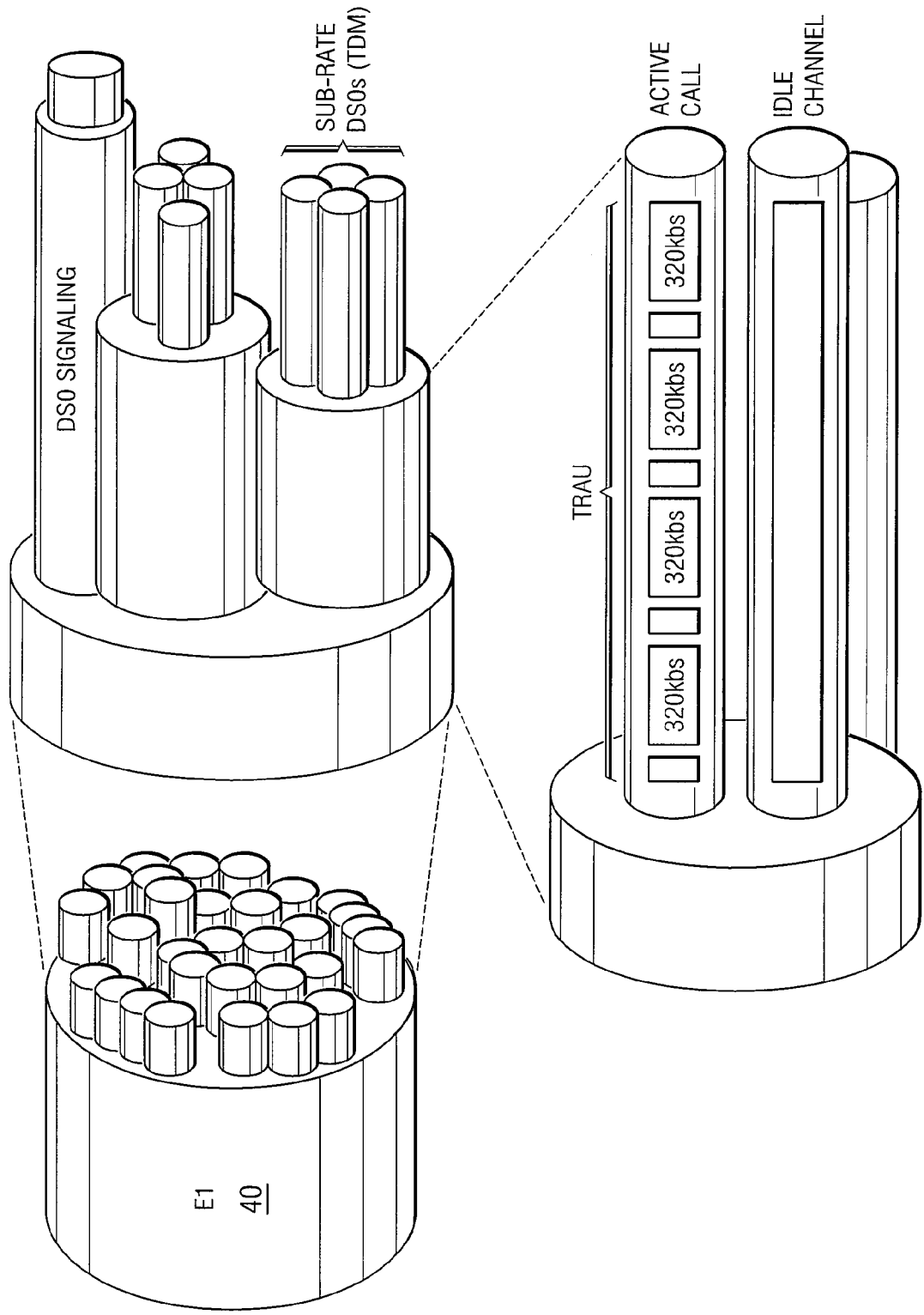
FIG. 3 is a simplified schematic diagram of an example GSM 8.60 format.

FIG. 3 is simplified block diagram of an example GSM 8.60 format E1 structure. In operation of an example embodiment, consider a case where an end user is having a conversation using a mobile station. Voice frames from a given mobile station are generally being generated every 20 milliseconds in such a scenario. In a typical environment, there are 320-bit frames that are sent directly behind each other. In a native environment, base transceiver station 16 receives this information and converts it into TRAU frames. There is control information that is exchanged (on another channel) between base transceiver station 16 and base station controller 24 (over an E1 link 40) that indicates which channel or which sub-rate that will be assigned for this call.

When a call comes up, these frames (which are primarily of a fixed length) are put into T1/E1 sub-rates, whereby a DS0 is eight bits. These eight bits can be further divided into subrates (an 8 kilobit sub-rate corresponds to a single bit, a 16 kilobit sub-rate corresponds to two bits, a 32 kilobit sub-rate corresponds to four bits, and a 64 kilobit sub-rate corresponds to the full DS0).

In a simple case, a call is on a 16 kilobit sub-rate channel and it will be assigned to a time slot (and assigned one sub-rate inside that time slot) for transmission over the E1. Every 125 microseconds, two bits of the frame are being sent across the E1. Base station controller 24 receives this information, assembles the frames, and then presents them to the TRAU.

The framing protocol that is used (e.g. 16 kilobit TRAU frames, half-rate calls, etc.) is ignored. The algorithm will universally divide the channel into 8-kilobit sub-rates. In this manner, synchronization is not being attempted; only the raw bits are being evaluated. The algorithm can begin to collect bits on an 8-kilobit sub-rate basis. For example, if a full E1 is present, then 31 time slots (each time slot having 8 sub-rates) are present that could have data. Hence, a total of 248 eight-kilobit sub-rates could be active.

In this example embodiment, an FPGA could be employed to monitor the line and to separate the bits into 248 sub-rates. This particular protocol is reflective of an operating system (IOS) [which could be proprietary] and, further, how the application could be implemented. The FPGA can also collect a sample that contains 16 bits for each sub-rate (every two milliseconds). The FPGA can also perform demultiplex operations. After the two-millisecond interval elapses, the FPGA then has 16 bits collected for each sub-rate. The FPGA can then send an interrupt signal to IOS with this new packet (i.e. the super-frame) that has information for each of the sub-rates. From IOS, there will be 3968 bits (plus header bits), which consists of 248 samples of 16 bits each.

Over a period of ten samples, that data would add up to approximately a frames worth of data. Recall that the frames are of a fixed length (e.g. 160 bits). The algorithm can now take these and forward them to the other end (i.e. the base station controller) such that they can be demultiplexed and regenerated. Coupled to this super-frame is a header, which can have a bit-mask (where there is one bit for each possible 16-bit sample). It should be noted that the bit mask is not always necessary (i.e. not included in the backhaul frame header). In order to compress the data, the IOS records and saves ten samples (in a row) and then compares the sample that is currently being evaluated with a sample that occurred ten samples ago. Stated differently, the algorithm compares the sample that it received for that sub-rate to the same sample that it received ten instances ago. Thus, the algorithm compares new bits to similar bits that would have been provided in the same bit position in a previous frame. Communication system 10 capitalizes on the intrinsic nature of the data and the inherent characteristics of the fixed length restrictions.

The suppression changes dynamically based on the data that is being communicated. In addition, protocols such as HDLC can be significantly optimized such that flags will synchronize or line-up such that they are compressed out. Similarly, idle frames (or idle periods between frames) or silence will readily be compressed.

Figure 4:
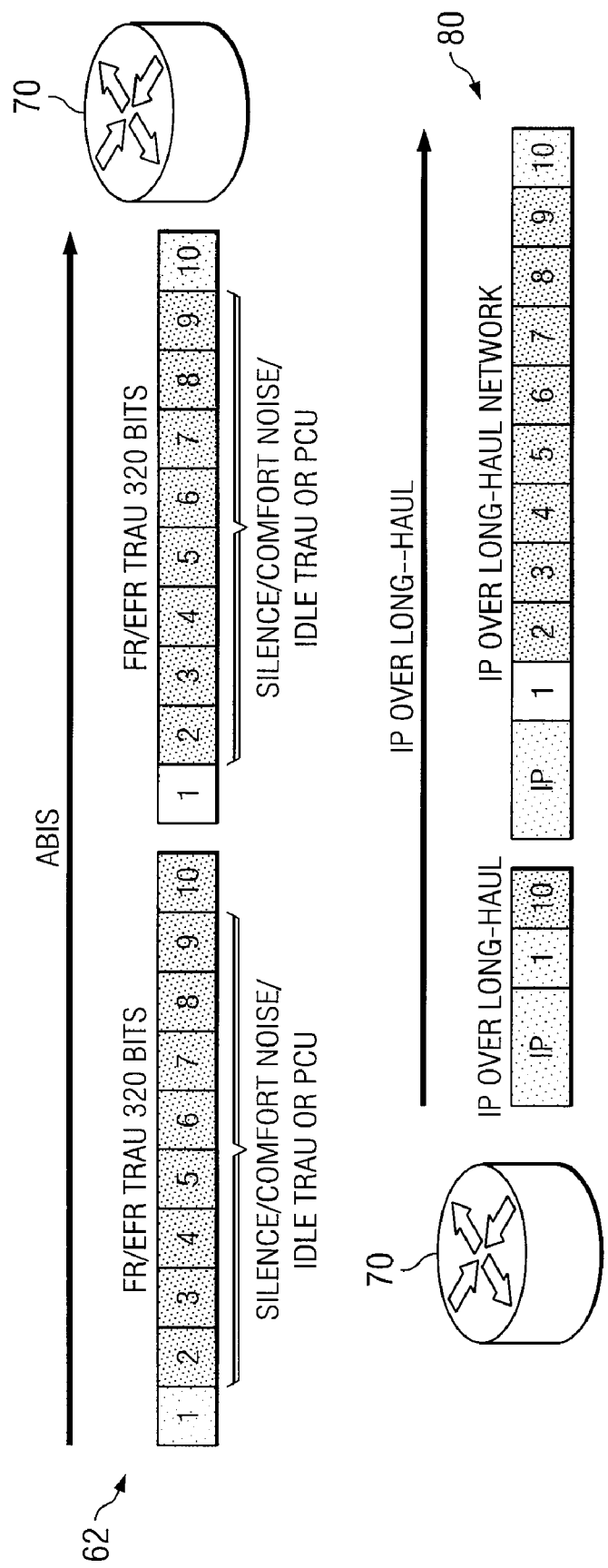
FIG. 4 is a simplified schematic diagram of an example associated with the communication system.

FIG. 4 is a simplified block diagram of an example that illustrates some of the concepts that have been discussed above. It should be emphasized that such an illustration is only a logical view of the present invention. Specifically, a single TRAU frame is generally not sent in the same IP backhaul packet, as FIG. 4 suggests. FIG. 4 has only been offered for purposes of teaching and discussion. Indicated generally at 62 are two TRAU frames being received by a router 70 (or a switch, a gateway, etc.), which is located on the base station controller side of the network. These represent the standard 320-bit frames that are coming into the system. Within the frames are the samples that were described previously. The first of these TRAU frames that is being received by router 70 is indicative of the whole sample, which should be sent unchanged (as it is the first sample).

This first sample is stored by router 70 and then the second of these TRAU frames is received by router 70. Now two samples can be compared (i.e. samples from one frame can be compared to samples from a previous frame). In this example, samples 2-9 are the same and, hence, do not have to be transmitted on the backhaul. An IP over long-haul element 80 is provided that illustrates how the data is actually transmitted across the backhaul. As identified earlier, the first TRAU frame is still transmitted over the backhaul. However, the second TRAU frame is handled differently, as the algorithm of the system can readily identify this opportunity for suppression/compression. In the second packet that is being sent, samples 2-9 are not included. Only samples 1 and 10 are being sent in the second packet because only those samples are different between the two packets.

Hence, when samples between two frames are different, then the samples are included in the packet and sent across the backhaul. When samples are the same, then there is no need to send them over the backhaul. The repeating samples only need to be played back and not transmitted over the backhaul. Stated in another way, only the "deltas" are transmitted over the backhaul. The delta reflects the difference in the bits that would be in the same position of the previous frame.

Another aspect of communication system 10 addresses the retransmit issue outlined earlier in the Specification. Recall that packets are made up of samples, which can include a delta for a voice packet that was transmitted on the backhaul. The samples in that voice packet need to be played out (in real-time at the other network end) into TRAU frames. A typical TRAU frame can be divided into ten different samples. In cases where a packet propagating across the backhaul is lost, and the delta was also lost, the component at the remote end would not be able to detect this change. The remote-end device would continue to transmit incorrect bits. This is not necessarily a problem in all cases because the samples (in a voice conversation) are constantly changing. Hence, such a problem could go unnoticed, as only a small (barely audible) glitch may occur during the call. However, in the case that errors occur in a first non-identical sample followed by identical samples, the time associated with the glitch is more substantial.

In landline scenarios, a typical protocol in which the receiver detects an error and requests a retransmission can be used because recovery can occur within several milliseconds. However, if there are errors that propagate along a satellite path, the time associated with the aforementioned glitch and typical error recovery could be about 700 milliseconds. In such a case, the call could be significantly interrupted and even inaudible in some scenarios.

One approach to address this issue is a preemptive retransmit. This occurs when it is detected that a sample has stopped changing for a certain amount of time [e.g. 10 milliseconds], which is user-configurable. Hence, the sample that did not change will be transmitted. This guarantees that the remote end will receive the update or the delta, even in cases where the original packet, which included that change, was lost. This approach provides the advantage of correcting errors with a small amount of overhead, where there is no need for an acknowledgement from a peer device.

It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 4, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, compression, and suppression techniques. In addition, any of the described elements may be provided as separate external components to communication system 10 or to each other where appropriate. The present invention contemplates great flexibility in the arrangement of these elements as well as their internal components.

In addition, although the preceding description offers an error recovery protocol to be implemented with particular devices (e.g., aggregation node 22 and cell site element 18), the compression/suppression protocol provided may be embodied in a fabricated module that is designed specifically for effectuating the techniques discussed above. Moreover, such a module may be compatible with any appropriate protocol, other than those discussed herein, which were offered for purposes of teaching and example only. Also, such an error recovery/retransmit solution is equally applicable to landline scenarios, as the error recovery approach could be used to address any of the error issues identified above.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus, comprising:
    a cell site element associated with a base transceiver station and operable to:
        receive a plurality of packets associated with a communications flow, each packet comprising a plurality of Global System for Mobile (GSM) subrates; and
        recover data lost from a packet by performing the following within a recovery interval:
            retransmitting a first GSM subrate of the lost packet at a first time; and
            retransmitting a second GSM subrate of the lost packet at a second time, the difference between the second time and the first time being a predetermined time period.

2. The apparatus of claim 1, the predetermined time period being twenty milliseconds.

3. The apparatus of claim 1, wherein the cell site element is operable to skip over a subrate that has already been transmitted within the recovery interval.

4. The apparatus of claim 1, wherein the cell site element is operable to:
    detect additional lost data for the lost packet;
    reset the recovery interval; and
    perform the following within the rest recovery interval:
        retransmit the first GSM subrate of the lost packet at a third time; and
        retransmit the second GSM subrate of the lost packet at a fourth time, the difference between the fourth time and the third time being the predetermined time period.

5. The apparatus of claim 1, wherein the cell site element includes a dynamic suppression element that is operable to perform one or more suppression and positioning operations.

6. The apparatus of claim 1, further comprising:
    an aggregation node associated with a base station controller and operable to communicate with the cell site element.

7. A method, comprising:
    receiving a plurality of packets associated with a communications flow, each packet comprising a plurality of Global System for Mobile (GSM) subrates; and
    recovering data lost from a packet by performing the following within a recovery interval:
        retransmitting a first GSM subrate of the lost packet at a first time and
        retransmitting a second GSM subrate of the lost packet at a second time, the difference between the second time and the first time being a predetermined time period.

8. The method of claim 7, the predetermined time period being twenty milliseconds.

9. The method of claim 7, further comprising:
    skipping over a subrate that has already been transmitted within the recovery interval.

10. The method of claim 7, further comprising:
    detecting additional lost data for the lost packet;
    resetting the recovery interval; and
    performing the following within the rest recovery interval:
        retransmitting the first GSM subrate of the lost packet at a third time; and
        retransmitting the second GSM subrate of the lost packet at a fourth time, the difference between the fourth time and the third time being the predetermined time period.

11. Software for communicating data, the software being embodied in a non-transitory computer readable medium and comprising computer code such that when executed is operable to:
    receive a plurality of packets associated with a communications flow, each packet comprising a plurality of Global System for Mobile (GSM) subrates; and
    recover data lost from a packet by performing the following within a recovery interval:
        retransmitting a first GSM subrate of the lost packet at a first time and
        retransmitting a second GSM subrate of the lost packet at a second time, the difference between the second time and the first time being a predetermined time period.

12. The medium of claim 11, the predetermined time period being twenty milliseconds.

13. The medium of claim 11, wherein the code is further operable to:
    skip over a subrate that has already been transmitted within the recovery interval.

14. The medium of claim 11, wherein the code is operable to:
    detect additional lost data for the lost packet;
    reset the recovery interval; and
    perform the following within the rest recovery interval:
        retransmit the first GSM subrate of the lost packet at a third time; and retransmit the second GSM subrate of the lost packet at a fourth time, the difference between the fourth time and the third time being the predetermined time period.

15. A system, comprising:
means for receiving a plurality of packets associated with a communications flow, each packet comprising a plurality of Global System for Mobile (GSM) subrates; and
means for recovering data lost from a packet by performing the following within a recovery interval:
  retransmitting a first GSM subrate of the lost packet at a first time; and
  retransmitting a second GSM subrate of the lost packet at a second time, the difference between the second time and the first time being a predetermined time period.

16. The system of claim 15, the predetermined time period being twenty milliseconds.

17. The system of claim 15, further comprising:
means for skipping over a subrate that has already been transmitted within the recovery interval.

18. The system of claim 15, further comprising:
means for detecting additional lost data for the lost packet;
means for resetting the recovery interval; and
means for performing the following within the rest recovery interval:
  retransmitting the first GSM subrate of the lost packet at a third time; and
  retransmitting the second GSM subrate of the lost packet at a fourth time, the difference between the fourth time and the third time being the predetermined time period.

* * * * *